United States Patent [19]

Shirley

[11] 4,009,886

[45] Mar. 1, 1977

[54] SPINDLE ADAPTER

[76] Inventor: Gerald Shirley, 111 Lake Ave., Tuckahoe, N.Y. 10707

[22] Filed: Sept. 18, 1975

[21] Appl. No.: 614,641

[52] U.S. Cl. .............................................. 274/10 S
[51] Int. Cl.² ........................................ G11B 17/04
[58] Field of Search ................................ 274/10 S

[56] References Cited
UNITED STATES PATENTS

| | | | |
|---|---|---|---|
| 3,191,941 | 6/1965 | Krahulec | 274/10 S |
| 3,300,221 | 1/1967 | Shirley | 274/10 S |
| 3,477,727 | 9/1965 | O'Connell | 274/10 S |
| 3,689,080 | 9/1972 | Dennis | 274/10 S |

*Primary Examiner*—Steven L. Stephan
*Attorney, Agent, or Firm*—Norman Blumenkopf

[57] ABSTRACT

A 45 r.p.m. type flat spindle adapter is provided for use with a small diameter record changer spindle of the type having means for laterally shifting a record mounted thereon. The adapter has no moving parts and is provided with means to secure the adapter against rotation relative to the spindle so that the line of movement of the lateral shifting means of the spindle and the line defining the longer cross-sectional dimension of the adapter form an angle of about 5° to 45°.

This invention relates to the automatic record changer art, and more particularly, to new, useful and outstanding improvements in separate and detachable adapter for those record changers and phonographs which are manufactured with the so-called standard, small diameter spindles adapted to receive records which are provided with small holes of about 0.281 inch in diameter.

11 Claims, 4 Drawing Figures

U.S. Patent   Mar. 1, 1977   4,009,886
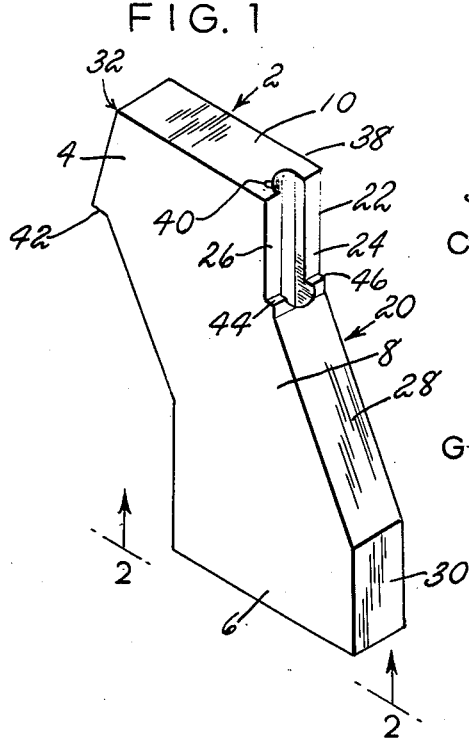
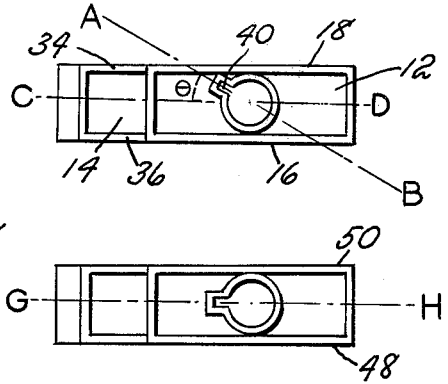
FIG. 3 PRIOR ART
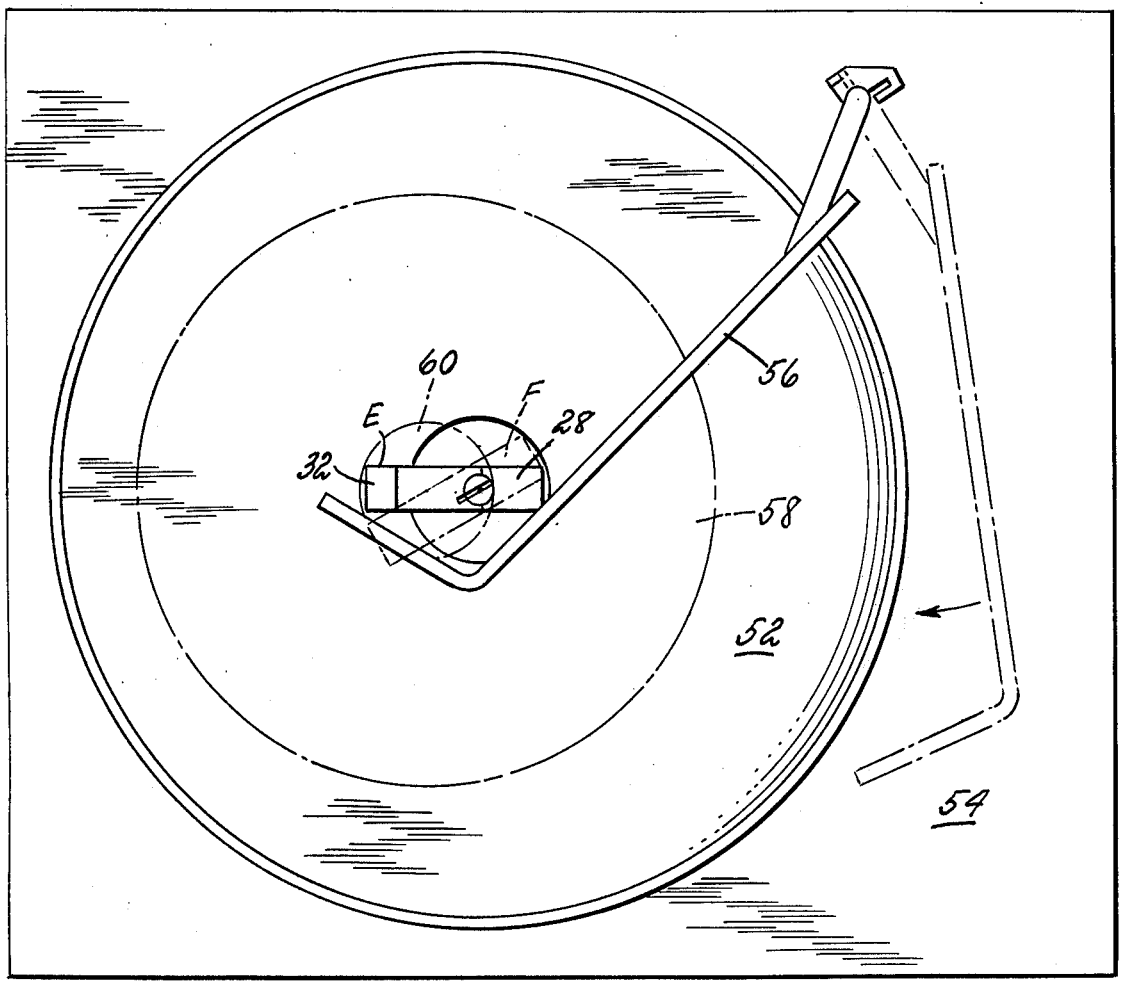

SPINDLE ADAPTER

BACKGROUND OF THE INVENTION

The earliest records with small diameter holes were those designed to operate on turntables rotating at 78 r.p.m. The first record changers, i.e., record players which can handle a plurality of records from a stack to provide continuous playing without interruption, of the drop type were similarly characterized. Within relatively recent times, there were developed both the long-playing 33⅓ r.p.m. and the small diameter 45 r.p.m. records, the latter, however, being provided with a comparatively large center hole of one and a half inches in diameter, while the former retained the standard small diameter hole.

While a limited number of record players were developed and manufactured specifically and restricted for use with the large diameter hole records, the greatest popular demand was and is for players, and particularly automatic record changers, with narrow diameter spindles to accommodate the standard 78 r.p.m. and the long playing 33⅓ r.p.m. large diameter records, especially since the 45 r.p.m. records can also be played thereon by resorting to either special wafer inserts or by the use of adapters provided by each changer manufacturer. The use of the wafer insert did not meet with popular consumer acceptance because of many factors among which the primary ones were inconvenience and inordinate expense. A further deficiency lies in the poor operation of the record changer with such wafer inserts due to poor and defective structural characteristics, especially after several uses of the wafer-inserted record. As a consequence of the deficiencies of the wafer inserts, and of the generally quite satisfactory performance of the spindle adapters, the latter represent the major marketable product for playing 45 r.p.m. records on automatic record changers.

The earliest adapters were cylindrical in shape and contained the necessary mechanical means to translate the actions of the turntable spindle ejector lever, pusher or equivalent means to actuate the one-by-one drop of records as required. There then followed developments of a flat generally rectangular, adapter with moving parts, both cylindrical and flat adapters with no moving parts and universal adapters, the latter as shown in my earlier U.S. Pat. Nos. 3,300,221 and 3,365,201. Both because of their lower cost and greater reliability due to lack of moving parts which can, obviously, malfunction, the adapter with no moving parts is generally to be preferred. For many of the major record changers, and, in fact, with the majority of those in use and being sold today, there is no adapter available except a flat one with moving parts. The reason for this lies in the basic difference in construction between an adapter with moving parts and one without moving parts. The former type whether cylindrical or rectangular in shape has as its largest and cross-sectional dimension the size of the central opening (actually a bit smaller to permit rotational clearance) of a 45 r.p.m. record, which is 1.5 inches. An adapter with no moving parts has as its general construction an upper portion offset from a lower portion so that the ejector lever of the spindle is exposed and therefore, its largest cross-sectional dimension is about 50% greater than the conventional adapter with moving parts, or in other words, is about 2.25. Because of this difference, and because of the general construction of many, if not the major amount record changers, and particularly because of the construction of the balance (or ballast) arm, the adapter with no moving parts, and more especially, the flat adapter can not be used with these major amounts of changers.

The problem vis-a-vis the balance arm arises from one of the primary functions thereof, which is to maintain the stack of records to be played on the changer in a horizontal position. This is necessary in order to permit the records to drop properly without any jamming or any other difficulty. Another function of the balance arm on many changers is to shut off the record player after the last record is played. This results from the coactions of the tone or playing arm and proper position of the balance arm after the last record has been played.

In order for the balance arm to perform its function of maintaining the record to be played (or stack of records) in a horizontal position, the balance arm must be in the proper position to move freely vertically so as to maintain a force on the record and follow the record stack as records are fed to the playing position on the turntable. With the majority of changers now being manufactured, this "proper position" places the balance arm, generally about one-half inch from the changer spindle. As a consequence of this small clearance, cyclindrical adapters, whether with or without moving parts, cannot be used since the closest that the balance arm can come to the changer spindle is ½ the diameter of the cylindrical adapter (1/5inch) minus ½ the diameter of the changer spindle (about $0.14 \pm 0.02$ inch) or about 1.34 to 1.38 inches. The prior art flat adapters with moving parts are manufactured so that they are generally rectangular in cross-section with dimensions of about 0.5 inch to 0.8 inch × 1.50 inches thereby permitting their use with most, if not all, changers. As pointed out above, however, flat adapters with no moving parts (e.g., rectangular in shape) cannot be used because their larger dimension (i.e., 2.25 inches) resulting from the offset configuration of this type of adapter, interferes with the end portion of the ballast arm. This end portion is generally an arcuate extension of the ballast arm which is necessary to maintain the records or records in the stack in proper horizontal position.

It is, therefore, an object of this invention to provide an adapter with no moving parts which can be used with record changers and particularly with those whose present construction, and especially the construction of the ballast or balance arm, do not normally permit the use of adapters with no moving parts.

It is a further object of this invention to provide a flat adapter, generally of rectangular shape, with no moving parts which can nevertheless be used with most present day record changers.

It is a still further object of this invention to provide a flat adapter with no moving parts which can be used to play 45 r.p.m. large-center hole records on record players provided with a small diameter or narrow spindle.

Other objects will appear thereinafter as the description proceeds.

The objects of the present invention and others are achieved by providing a spindle adapter of the flat or rectangular style and wherein the longitudinal opening or passageway therein, which is adapted to receive the small diameter spindle of the record changer, is provided with means, preferably a recess or groove which is disposed at an acute angle of from about 5° to less than about 45°, and preferably from about 10° to about 40° from its normal position (which is a point or small arc) to one on a line which is the locus of points defining the diameter of the narrow spindle of the changer and extending through the mid point of the arc which defines the shelf on said narrow spindle, and which shelf serves to support the bottom record and those, if any on top of this record.

In the prior art, flat adapters with no moving parts, a groove or recess is provided in the narrow spindle passageway for two purposes. One is to provide rearward clearance for a slotted blade and/or record ejector, finger or lever of the narrow spindle. The other purpose is to lock the adapter against rotation relative to the narrow spindle. This is necessary to assure proper alignment of the adaptor with the narrow spindle so that the records will drop properly upon the forward and lateral movement of the ejector lever of the narrow spindle.

A clear disclosure of this can be found in U.S. Pat. No. 3,689,080 to Dennis and particular reference is made to FIG. 9 showing the recess as a "keyhole slot" which is along a line defining the path of movement of the ejector member of the narrow spindle of the record changer. A similar disclosure can also be found in U.S. Pat. No. 3,191,941 to Kahulec wherein a cylindrical non-moving part adapter with such a slot is also shown.

The present invention will be more clearly understood and further elaborated upon from the following description with reference to the accompanying drawing wherein FIG. 1 is a perspective view of a spindle adapter of this invention;

FIG. 2 is a bottom plan view taken along the line 2—2 of FIG. 1.;

FIG. 3 is a bottom plan view of a prior art flat adapter taken similarly as FIG. 2;

FIG. 4 is a top plan view of a record loaded on the adapter of this invention which in turn has been mounted on the narrow spindle of the turntable along with necessary position of the ballast arm during the playing or a record.

Referring to the drawings, in which like reference numerals indicate the parts throughout the various figures, the numeral 2 refers to the spindle adapter in its entirety. The adapter comprises generally an upper section 4, a lower section 6 and an intermediate section 8. The adapter shown, being generally rectangular is cross-section, comprises side faces 16 and 18, which are depicted as generally parallel but which need not necessarily be so, top face 10, a bottom portion 12, front face 20 and a rear face (not identified). Front face 20 comprises a front upper portion 22 defined by two edges 24 and 26, a slanted front intermediate portion 28 and a front lower portion 30. The rear face also comprises a rear upper portion 32, and a rear intermediate slanted portion 14 defined by slanted edge portions 34 and 36. Extending longitudinally from the top face 10 to bottom portion 12 is passageway 38 adapted to receive the small diameter spindle of the record changer. The diameter of the passageway 38 is slightly larger than the diameter of the small diameter spindle of the record changer. In order to provide the proper positioning of the adapter on the changer spindle and also to provide clearance for rearward movement or extension of the records shifting or ejecting means of the changer spindle, a groove or slot 40 is provided in the passageway at a position on the periphery or wall of the passageway 38 so that a diameter line of the passage way through the slot is disposed at an angle of from about 5° to about 45° and preferably about 10° to about 40° relative to a diameter line of the passageway generally parallel to the side faces (i.e., extending rearwardly and generally equidistant from each side face) 16 and 18. A typical ∠ θ is shown in FIG. 2, this angle being defined by one diameter line A-B through slot 40 and the other equidistant line C-D.

With further reference to the drawings, upper rear portion 32 is provided with an undercut portion 42 which has a height at least equal to slightly more than the thickness of one record, but less than two records, and which height is above and relative to the horizontal plane of the small diameter spindle record supporting shelf which is in horizontal planar alignment with adapter supporting shelves 44 and 46, to permit the lateral shifting of a record from the stack to enable it to clear the supporting shelves of the changer spindle and adapter and slide down into playing position. The adapter may be and preferably is provided with the supporting shelf means 44 and 46, although shelf 44 may be eliminated if desired; shelf 46 is more preferred particularly where ∠ θ is greater than about 20°.

With specific reference to FIG. 3, it will be noted that in prior art adapters the slot is disposed so that it is on the passageway diameter line G-H which extends generally centrally between the side faces 48 and 50.

Other constructional features of the present adapter which are obvious and form no part of the present invention relate to certain dimensional characteristics. Thus, the cross-sectional configuration of the upper section 4 and lower section 6 must be such as to receive the conventional large-diameter-center-hole 45 r.p.m. record, and should engage the inner edge defining the central opening of the record at sufficient points or arcuate segments of said inner eddge to properly center the record to properly feed from the stack, to properly move the record into playing position, and to prevent eccentric rotation of the record when in the playing position.

Two points or arcs of contact will suffice, although three or four may be preferred.

Similarly, it is preferred that the slanted intermediate reaction be of similar dimensional characteristics.

FIG. 4 depicts in top plan view a record in loaded position with the adapter properly positioned on the change spindle. The operating position of the ballast arm is shown and there is no interference with the adapter.

While the adapter of this invention has been shown and described with specific reference to the drawings, it is obvious that many modifications in dimensional characteristics can be made herein. Thus, intermediate section 8 and lower section 6 need not be flat or generally rectangular in cross-section although such features are preferred. These sections may be cylindrical, elliptical or otherwise to accommodate large-diameter center hole 45 r.p.m. record. The upper section, too, need not be truly rectangular but may be trapezoidal or a highly eccentric ellipse, or indeed any polygon. By "rectangular" or "flat" is meant any of the aforementioned geometric shapes and others wherein there is generally (in cross-section) a longer axis and a shorter axis with the former being preferably at least twice the latter, with the width or shorter axis no more than about 1 inch and preferably no more than about 0.75 inch and more preferably no more than about ½ inch with the longest dimension obviously less than 1.5 inches (but only slightly so as hereinbefore pointed out) to accommodate the record.

Still further, while the means for proper positioning of the adapter has herein been described as a slot in the passageway to receive the change spindle, it is, of course, clear that other equivalent positioning and locking means such as a suitable set-screw can also be employed. It is also within the scope of the present invention to provide the adapters in "universal" form so that one adapter may be accommodated on a variety of different changer spindles. Full details of such structures are disclosed in my prior U.S. Pat. Nos. 3,300,221 and 3,365,201 and the disclosures of these patents is incorporated herein by reference thereto. As illustrations of such modifications, it is within the purview of this invention to provide lower section 6 with a telescoping section or legs for varying the height of the adapter shelf above the turntable to accommodate the turntable spindle shelf height. This telescoping section may be "freefloating" in the case of adapters supported by the top of the spindle (see U.S. Pat. No. 3,365,201) or fixed into position as with a set screw or screws where support is by the turntable (see U.S. Pat. No. 3,300,221).

In FIG. 4, there is shown in top plan view a record changer turntable 52 mounted on a suitable base 54 and having a conventional ballast arm 56. The latter is shown in dotted line in the "rest" position and otherwise in the playing position. The spindle adapter 2 of this invention is shown as positioned at E and it clears the ballast arm 56. The prior art adapter is shown as it would be positioned at F and it does not clear the ballast arm. A record 58 with an enlarged center hole 60 (45 r.p.m. type) is shown mounted on adapter 2. The record would take a like position on the prior art adapter in position F, but the adapter does not clear the ballast arm. Also shown is the enlarged center hole 60 offset when in the playing position.

What is claimed is:

1. A flat spindle adapter for use with a record changer having a rotatable turntable and a small diameter spindle adapted to receive a record with a small diameter central opening, said spindle having means for supporting a record at a proximal edge thereof, said proximal edge defining the small diameter central opening of the record, said spindle also having means for shifting a record laterally relative to said spindle, said spindle adapter having a body with a passageway to receive said small diameter spindle, said passageway having an exposed segment at least at the said spindle supporting means, means associated with said passageway to fix the position of the spindle adapter so that the line defining the path of movement of the said record shifting means is at an angle of from about 5° to about 45° relative to the line formed by extending a diameter line of the spindle through the midpoint of the exposed segment of said passageway.

2. A spindle adapter as defined in claim 1 wherein the arcuate length of the exposed segment of the passageway is about equal to the arcuate length of the spindle record supporting means.

3. A spindle adapter as defined in claim 1 wherein the said angle is about 35°.

4. A spindle adapter as defined in claim 1 wherein the means associated with said passageway to fix the position of the spindle adapter is a recess or groove.

5. A spindle adapter as defined in claim 1 wherein the said diameter line is a line which is the longer central axis of the adapter in horizontal cross-section.

6. A spindle adapter as defined in claim 5 wherein the means associated with said passageway to fix the position of the spindle is a recess or groove.

7. A spindle adaptor as defined in claim 6 which is rectangular in cross-section.

8. A flat spindle adapter for use with a record changer having a rotatable turntable and a small diameter spindle adapted to receive a record with a small diameter central opening, said spindle having means for supporting a record at a proximal edge thereof, said spindle also having means for shifting a record laterally relative to said spindle, said spindle adapter having a body with upper and lower portions said upper portion being offset in a vertical plane from said lower portion and a passageway extending from said lower portion to said upper portion to receive said small diameter spindle said passageway having an exposed segment at the said spindle record supporting means, and means associated with said passageway to fix the position of the spindle adapter and prevent rotation thereof relative to the small diameter spindle, said fixed position of said spindle adapter being such that the diameter line of the spindle through the midpoint of the spindle record supporting means is at an angle of from about 5° to about 45° with a line corresponding to the longer horizontal cross-sectional axis of the spindle adapter.

9. A spindle adapter as defined in claim 8 wherein the means to fix the position of the spindle adapter is a recess or groove in said passageway.

10. A spindle adapter as defined in claim 9 which is rectangular in shape in horizontal cross-section.

11. A spindle adapter as defined in claim 10 wherein the said angle is from about 20° to 40° and the dimensions of the adapter are such as to give maximum horizontal cross-sectional dimensions of from about 0.5–0.8 inch X about 2.25 inches.

* * * * *